Figure 7:
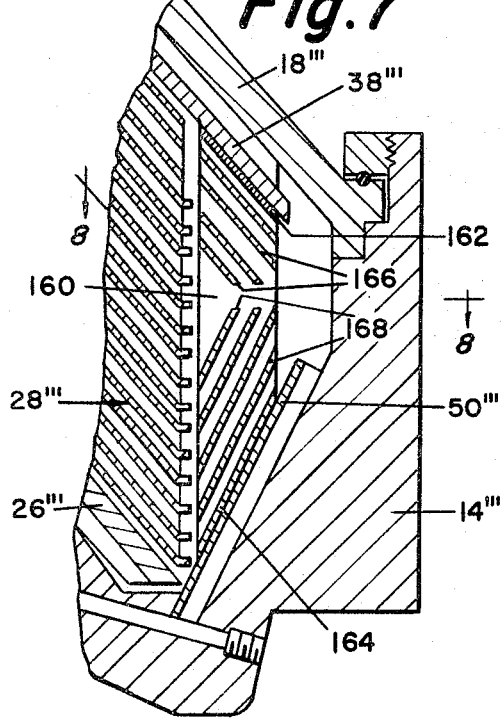

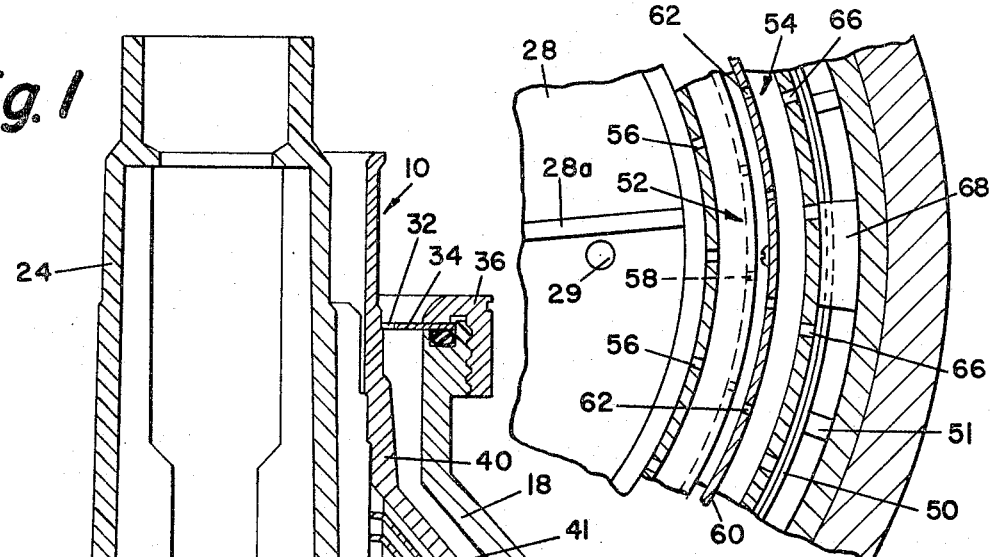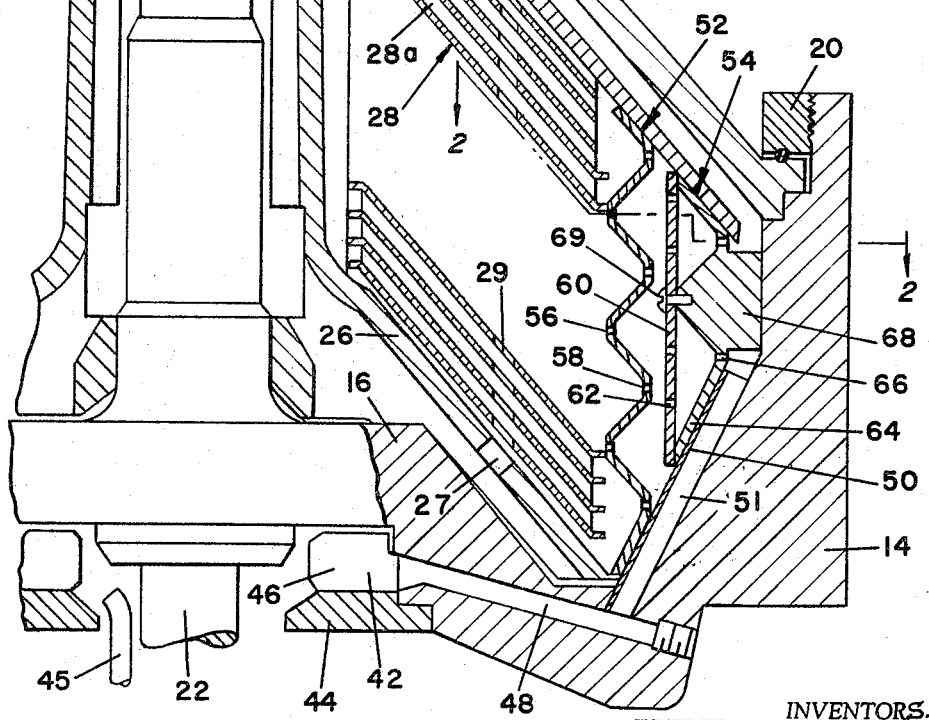

June 27, 1967     F. W. KEITH, JR., ETAL     3,328,282
SEPARATION OF COMPONENTS OF LIQUID-SOLID MIXTURES
Filed Feb. 28, 1962     5 Sheets-Sheet 2
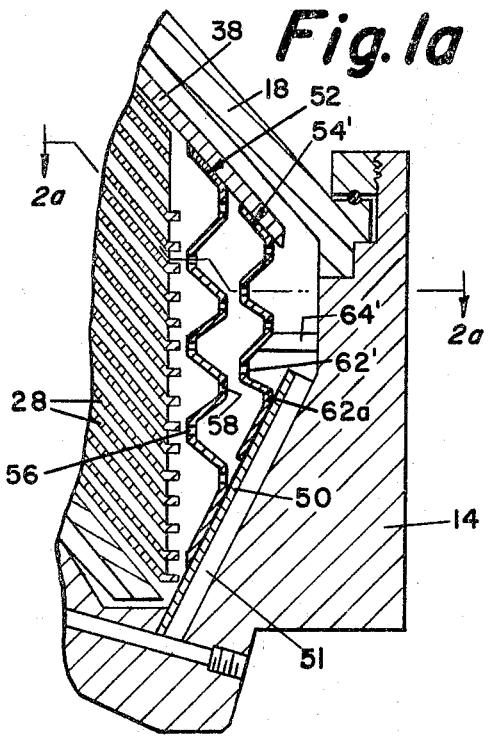
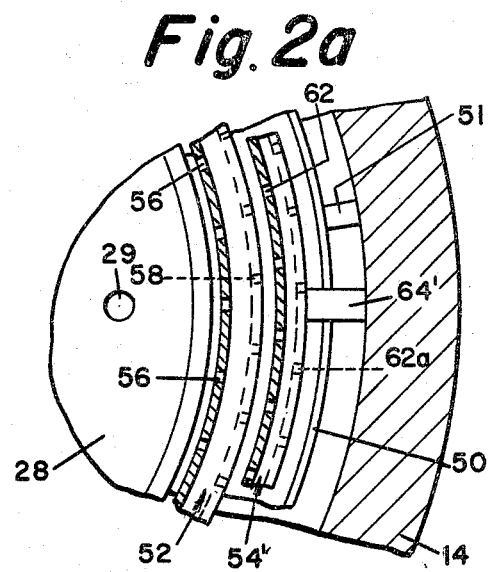
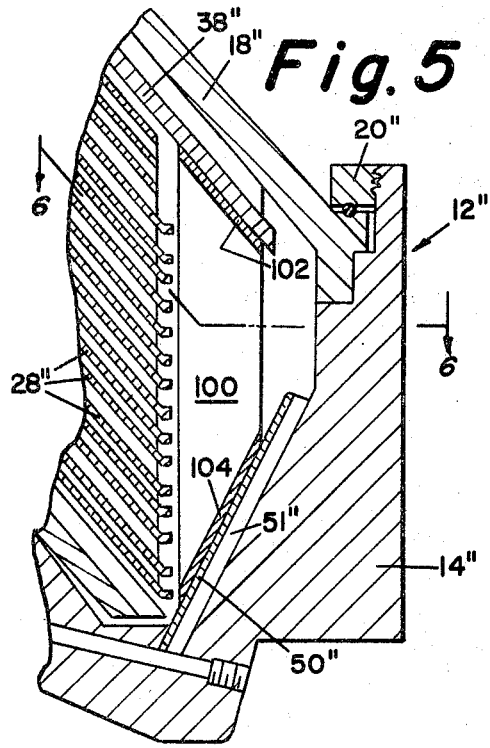
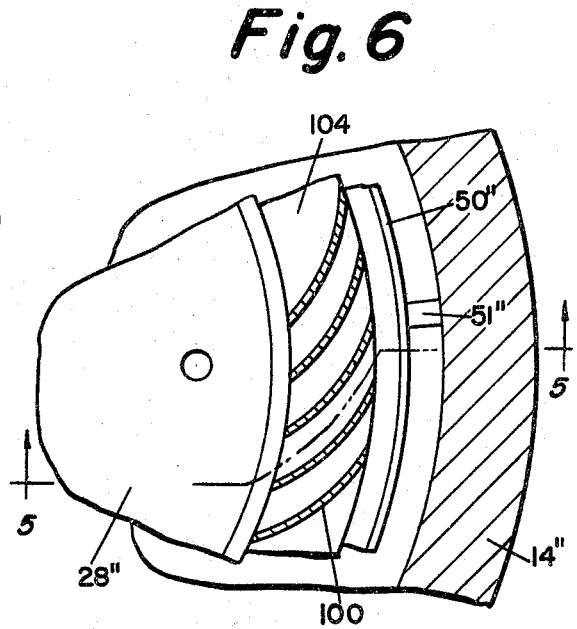
INVENTORS.
FREDERICK W. KEITH, JR.
ANDRE C. LAVANCHY
BY Dallett Hoopes
ATTORNEY

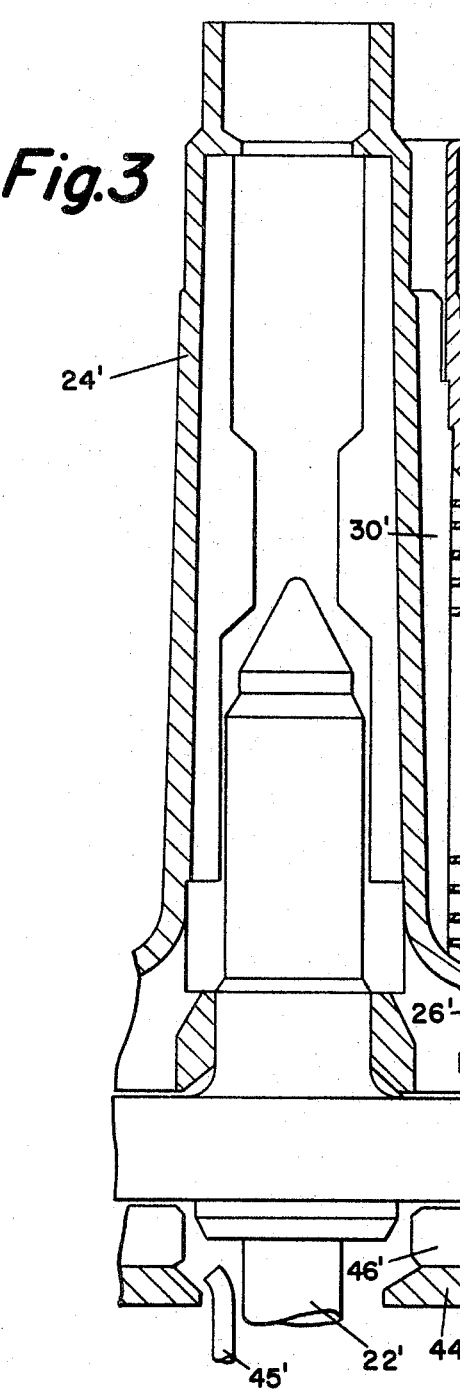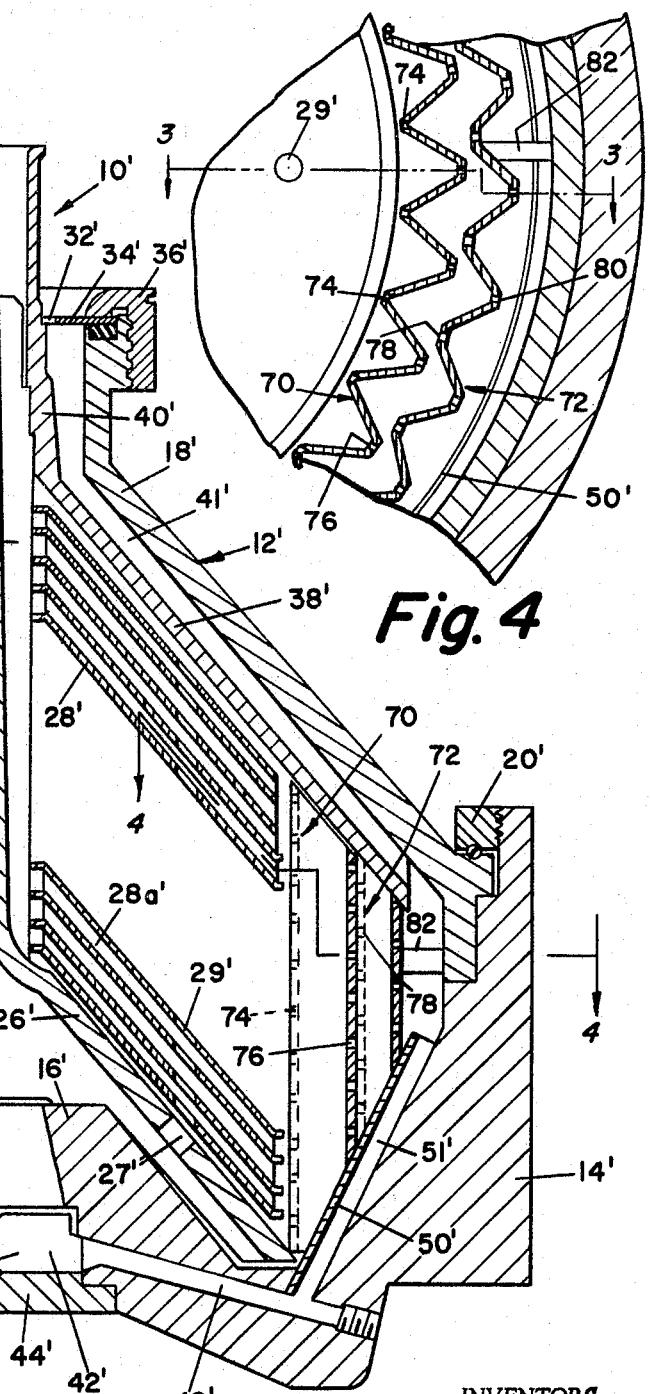

INVENTORS.
FREDERICK W. KEITH, JR.
ANDRE C. LAVANCHY
BY Dallett Hoopes
ATTORNEY

June 27, 1967  F. W. KEITH, JR., ETAL  3,328,282
SEPARATION OF COMPONENTS OF LIQUID-SOLID MIXTURES
Filed Feb. 28, 1962  5 Sheets-Sheet 5
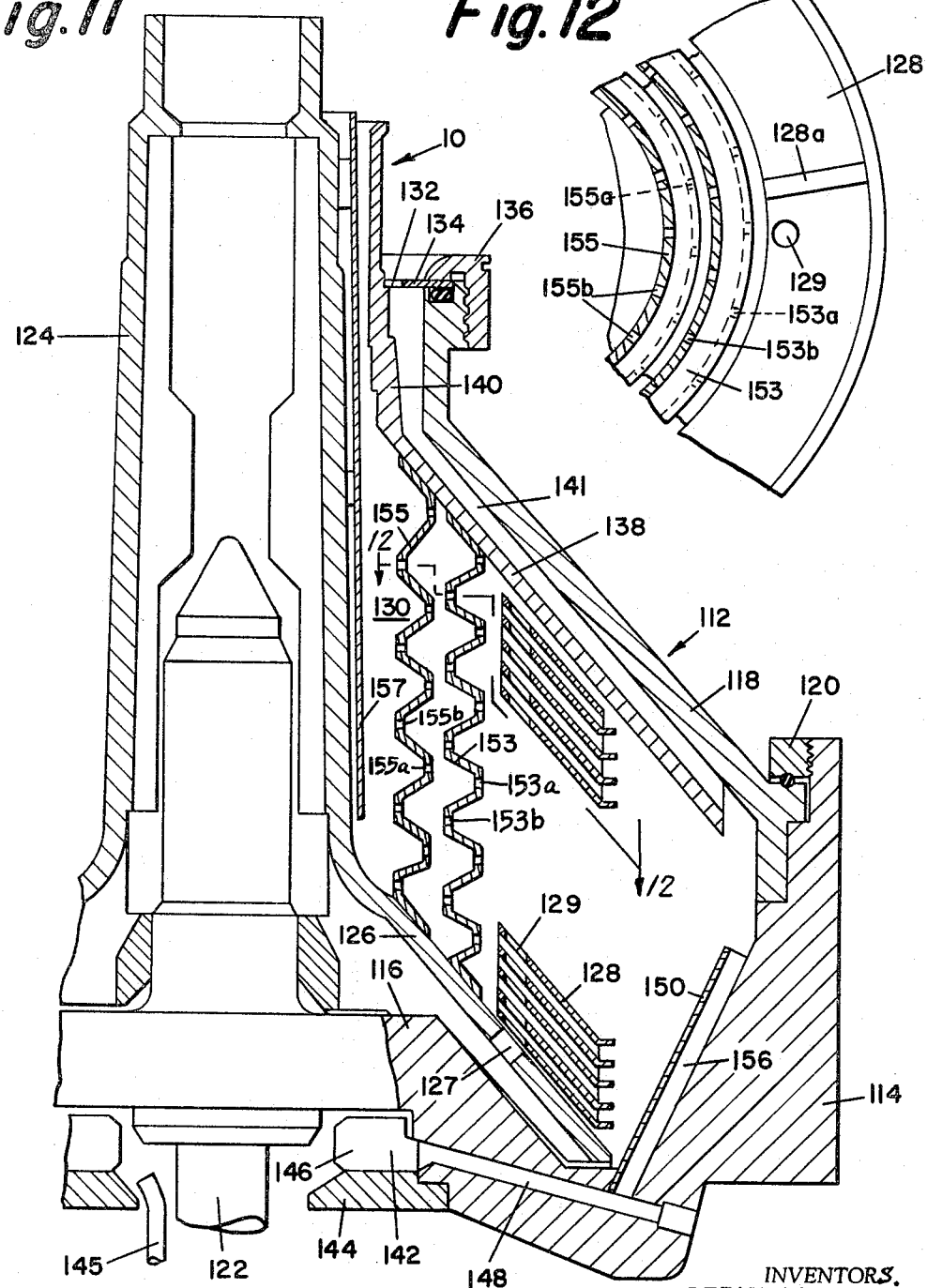
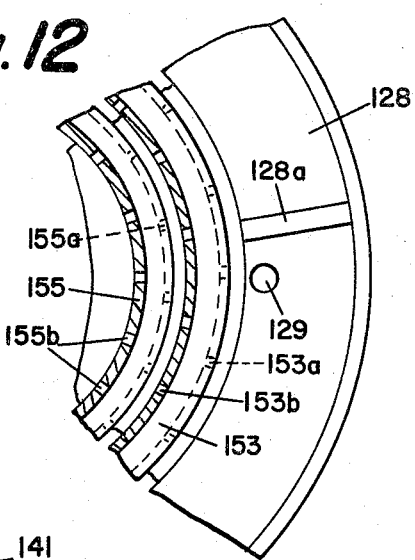
INVENTORS.
FREDERICK W. KEITH, JR.
ANDRE C. LAVANCHY
BY Dallett Hoopes
ATTORNEY _United States Patent Office_ 3,328,282
Patented June 27, 1967

3,328,282
SEPARATION OF COMPONENTS OF LIQUID-SOLID MIXTURES
Frederick W. Keith, Jr., Gladwyne, and Andre C. Lavanchy, Devon, Pa., assignors to Pennsalt Chemicals Corporation, a corporation of Pennsylvania
Filed Feb. 28, 1962, Ser. No. 176,355
3 Claims. (Cl. 208—28)

This invention relates to the centrifugal separation of solids from liquid. More specifically this invention relates to a centrifugal process including the compaction or concentration of solids in a mixture of such solids and liquid and the separation of the compacted solids from the liquid.

The invention broadly contemplates the working or mechanical treatment of solids in the centrifuging zone so that the solids may arrange themselves more compactly with a consequent reduction in the liquid content of the solids discharge. The invention finds application in many fields.

Since the invention was conceived and perfected in connection with the dewaxing of hydrocarbon oil and finds effective use therein, some description and the examples hereunder pertain to such application of the invention. However, it should be understood that the invention has an application in the compaction and concentration of many solids in a mixture of such solids and a liquid and of the separation of the compacted solid from the liquid. Aside from the dewaxing of hydrocarbon oil, the invention is useful in a comparable application: the winterizing of vegetable oil. It also finds use in the concentration of a flocculent sediment such as alum-loaded water treatment of solids. These uses, however, are merely illustrative of the applications of the invention and the scope of the invention should not be limited thereby.

The prior art discloses the use of a centrifugal device to separate the higher melting portions of a hydrocarbon oil from the portions which melt at lower temperatures. The Patent 2,266,553 which issued Dec. 16, 1941 on an application filed by Leo D. Jones, for instance, discloses a process for dewaxing hydrocarbon oil in which a mixture including oil in solvent chilled to a temperature at which a portion of the oil crystallizes or otherwise solidifies is introduced into a centrifuging zone. The zone, which may be in the form of a centrifuge having a disc stack, receives the mixture and causes the outward movement of the heavier solidified wax portions toward the periphery of the zone. A heavy carrier liquid such as water or brine is introduced to the periphery of the zone and serves as a means for carrying the solid wax particles out of the bowl. The clarified oil is withdrawn from the inside of the disc stack at a locus about the axis of the zone.

While the apparatuses and processes of the prior art represented by the above-mentioned patent have been successful to a large extent in separating the wax solids from the oil, we have found that the effectiveness of such a separation can be enhanced by the working of the solids, e.g. wax solids, in a compaction space radially removed from the clarifying spaces, e.g. the disc stack, all within the centrifuging zone. By our process herein described, we are able to discharge from the centrifuging zone a mass of solids which occlude and entrain far less liquid than that discharged by the centrifuge processes of the prior art operating under comparable multiples of the acceleration of gravity. Since a reduction in the liquid content of the solids discharge is naturally accompanied by an increase in the clarified liquid discharge (the clarified discharge often being the more valued discharge), the economies of our process will be readily apparent.

We also provide for facilitation of inward movement of the liberated liquid to the liquid discharge.

This invention embodies other novel features, details of construction and arrangement of parts which are hereinafter set forth in the specification and claims and illustrated in the accompanying drawings, wherein:

FIGURE 1 is a fragmentary sectional view of an apparatus embodying the invention;
FIGURE 1a is a portion of FIGURE 1 showing modified baffle means;
FIGURE 2 is a fragmentary sectional view taken on the line 2—2 of FIGURE 1;
FIGURE 2a is a fragmentary sectional view taken on the line 2a—2a of FIGURE 1a;
FIGURE 3 is a fragmentary sectional view of a modification embodying the invention;
FIGURE 4 is a fragmentary sectional view taken on the line 4—4 of FIGURE 3; and
FIGURES 5 through 12 are sectional views in axial and indicated sectional planes, respectively, of four additional modifications embodying the invention. FIGURES 5 and 6; 7 and 8; 9 and 10; and 11 and 12 pertaining to the four embodiments respectively.

Briefly, the invention involves the introduction of a mixture including solids and a liquid into a zone of centrifuging comprising a clarifying space and a compacting space radially removed from the clarifying space. The solids after leaving the clarifying space are worked in the compacting space. The solids are withdrawn from the zone and the clarified liquid is withdrawn separately.

In the embodiment of the invention of FIGURE 1, the centrifuge rotor illustrated is of the disc type. The apparatus is broadly designated 10. It comprises a rotor 12 including a shell 14 having a central hub 16 and a top 18. The top is held down against the shell by a threaded retaining element 20. The rotor is mounted on the power spindle 22, and receives center tube 24 which has its lower end disposed about the hub 16 but spaced therefrom.

The lower end of the center tube flares outwardly into a feed distribution skirt 26 spaced from the hub and shell of the rotor. Feed openings 27 are disposed in the skirt spaced inward from the outer edge. Surrounding the center tube 24 is a nested stack 28 of spaced frusto-conical discs which have feed openings 29 in vertical alignment with the openings 27. Each disc bears radial spacers 28a which comprise accelerator means as is conventional. Between the inner periphery of the stack 28 and the center tube 24 is a passage 30, and in alignment therewith is opening 32 in top 18. A dividing cone 38 which superposes the disc stack 28, is formed with longitudinal upward extension 40, and has its lower end extending well beyond the periphery of the disc stack cone, is spaced downward from the top 18 by a plurality of radially disposed circumferentially spaced wings 41. A ring dam 34 is secured over opening 32 by the threaded retaining element 36. A cover (not shown) is provided and has suitable collectors for the effluent.

At the lower end of the rotor about the spindle 22 is an annular inwardly facing pocket 42 partially defined by a ring element 44 secured against the shell. Radially disposed accelerating vanes 46 are provided in the pocket 42. From the pocket extends outward in the shell 14 the passages 48 which communicate with an upwardly directed cone-shaped passage defined by the shell 14 and the inward frusto-conical element 50. The passage terminates in an opening adjacent the center of the rotor wall. Element 50 is spaced from the shell by vanes 51. In an alternate embodiment, element 50 may be replaced by a plurality of tubes extending up from passages 48.

In the embodiment of the invention disclosed in FIGURES 1 and 2, particular attention is directed to the compaction space circumposing the clarifying spaces between the discs of the stack 28. The compacting means comprises the baffles 52 and 54. The inner baffle 52 is an annular element which fits about the disc stack and is held in place between the element 50 and the dividing cone 38. As shown, the baffle 52 comprises a series of complementing frusto-conical ring elements arranged in zig-zag manner to present a plurality of sets of converging surface portions. In production, the baffle 52 is turned from a heavy ring of stock and is of sufficient thickness to withstand the centrifugal force at the speeds developed by the rotor. As shown in FIGURE 2, the baffle 52 is formed with peripherally spaced orifices at the juncture between adjacent frusto-conical surfaces. The inward orifices are designated 56 and the outward orifices are designated 58.

The baffle 54 comprises a single ring element 60 having a plurality of spaced orifices 62. The element presents a substantially flat surface inward and is held in place by an annular element 64 presenting toward the axis complementing frusto-conical surfaces arranged in zig-zag fashion. Openings 66 between the surfaces permit passage of solids. Outward circumferentially spaced legs 68 engage the wall of the rotor to hold the baffle 54 in place. The bolts 69 secure the element 60 to element 64. It should be noted that the openings 66 are, in the embodiment shown, inward of the outer periphery of cone 38.

In the modified form of the apparatus disclosed in FIGURE 1a, the outer baffle 54' is in the form of a plurality of complementing frusto-conical ring elements arranged in zig-zag fashion with orifices at inner junctures between the rings indicated at 62' and outer orifices indicated at 62a. Suitable legs 64' may engage the wall of the rotor and extend inward to place the outer baffle. Alternatively the outer baffle may be supported by a post extending outward from the inner baffle. Variations of mounting means will be obvious to one skilled in the art.

In the operation of the apparatus embodying the invention as shown in FIGURE 1, the feed, which when the invention is used in dewaxing may comprise a chilled mixture of wax solids and hydrocarbon oil which may have been diluted with a solvent is introduced by a conventional feed tube into the center tube 24. The mixture thence is distributed outwardly and passes upward through the openings 27 in the skirt 26. Through the openings 29 the mixture is introduced successively into the separating spaces between adjacent discs, and in the disc stack the liquid in the mixture is clarified; that is, the liquid only passes inward along the upper surface of the individual discs and into the space 30 and thence over the upper edge of the longitudinal extension 40.

The wax solids move outward along the underside of the individual discs from the openings 29. For efficiency of separation an attempt is made to keep the so-called interface between the oil and the wax concentrate, about at the periphery of the disc stack. However, since the interface between the oil and the concentrate is indistinct, no specific position for an interface can be defined.

The wax or other outwardly moving solids in the feed are worked in the compacting space outward from the disc stack probably in accordance with the theories suggested herebelow. Most of the compacted solids move outward through the orifices 58, 62 and 66 to the carrier liquid and are discharged. As is conventional when carrier liquid is used, the interface between the carrier liquid and the solids is kept close to the periphery of the cone 38.

Oil or other inwardly moving liquid is liberated in the working of the solids. Oil liberated between the baffles is shielded by the baffle 52 from the outward movement of wax from orifices 58 and may move substantially unimpeded toward the openings 56. It is believed that the individual oil particles liberated between the baffles coalesce to form globules on the outside surfaces of the ring elements comprising baffle 52, and move toward and through the orifices 56. From the orifices 56 the oil moves into the disc stack for clarifying and ultimately out through the extension 40. Wax solids between the discs move outward into the compacting space. The discharge of the solids as indicated is effected by a brine or water or other immiscible fluid layer which comprises a carrier. The layer may be supplied by the supply tube 45 which delivers the liquid into the pocket 42. The wax solids are entrained by the layer and carried through the passages between wings 41 over the ring dam 34 to a suitable collector (not shown) wherein the solids and liquids may be further separated by additional treatment such as settling, additional centrifuging, distillation, or other conventional means.

It should be understood that in all embodiments of the invention the discharge of solids from the rotor can be achieved not only over a dividing cone as shown in FIGURE 1, but through peripheral nozzles. Such peripheral nozzle discharge of wax solids, for instance, is disclosed in the copending application Ser. No. 146,268, filed by Frederick W. Keith, Jr., in the U.S. Patent Office on Oct. 19, 1961, now Patent No. 3,192,149. The apparatus of the invention is useful with many types of nozzle arrangements, however, and is not limited to those of this copending application. Another variation of the process involves introduction of the carrier liquid with the feed rather than separately through passages such as 48, 50. When introduced with the feed, the carrier liquid will stratify against the rotor wall because of its greater density just as when introduced separately.

In the embodiment of FIGURE 1a, operation is presumed to be the same as in FIGURE 1, with the exception that any free oil on the outside of the baffle 54' may move inward against the outside of the baffles 54' to openings 62' with minimal interference from outwardly moving wax.

Radial accelerators may be provided in the compaction space of these embodiments if desired or necessary.

A modified form of the apparatus is disclosed in FIGURE 3 and FIGURE 4. For simplicity, parts of the apparatus disclosed in these figures which correspond to parts of FIGURES 1 and 2 are designated by the primed form of the same reference numerals.

In the FIGURE 3 embodiment, the compaction space outside of the disc stack includes an inner baffle 70 and an outer baffle 72. Each of these baffles is generally annular and, as shown in FIGURE 4 the baffle 70 comprises a zig-zag configuration of vertical plates presenting peripherally arranged complementing non-radial converging surfaces. Between the juncture of two adjacent plates on the inside of the baffle 70 are orifices designated 74, while on the outside of the baffle between adjacent surfaces are orifices designated 76. The upper and lower ends of the baffle are suitably bevelled and engage surfaces on the underside of dividing cone 38' and on the inside of the element 50', respectively. The outer baffle 72 as shown in FIGURE 4 similarly comprises a series of sets of zig-zag plates presenting complementing non-radial surfaces. At the juncture between surfaces at the inside of the baffle are openings 78, while at the juncture of surfaces at the outside of the baffle are openings 80.

The outer baffle 72 may be supported from a series of peripherally arranged struts 82 or posts extending inwardly from the shell wall or extending outwardly from the inner baffle 70. Any suitable means for supporting the baffle may be devised and is within the scope of the present invention.

Generally the operation of the apparatus disclosed in FIGURES 3 and 4 which embodies the invention is similar to the operation described above.

It is theorized that the embodiment of the invention as shown in FIGURES 3 and 4 has the added advantage that the vertical plates of the baffles serve also as vanes to assure acceleration of the liquid in the compaction space, and minimize turbulence.

It can be noted from FIGURE 4 that oil portions liberated from the solids between the baffles move inwardly toward the outer surfaces of baffle 70 and coalesce there to move through the orifices 74. The inward movement of oil is hence substantially not impeded by the outward movement of solids from orifices 76, an advantage which is characteristic of the invention. Similarly oil liberated on the outside of baffle 72 will move inward toward and through openings 78 substantially without interference from solids moving outward through openings 80.

In the embodiments of FIGURES 1, 2, 1a, 2a, 3 and 4 it will be noted that some effort has been made to avoid radial alignment of the orifices. In other words, directly outward from an opening 58, f.i., in baffle 52 is the surface 60. It is believed non-alignment effects better working of the solids and reduces the possibility of channelling.

It will be understood that the plurality of openings between complementing surfaces in the baffles may instead be a continuous slot or a series of discontinuous slots. Thus, in FIGURE 1, f.i., the openings 56 and 58 may be continuous slots. However, better working of the solids is achieved through individual orifices. In this connection, the size and number of the orifices influences the extent of the working or mechanical treatment, though optimum orifice size will differ according to the type of solids worked, the flow rate, and other factors. In the conditions of Example 1, orifices of about ⅛" have been found optimum.

Further, in the embodiments of FIGURES 1, 2, 1a, 2a, 3 and 4 some of the benefits of the invention can be retained by eliminating the outer baffle means 54, 54' and 72, respectively. Similarly the baffles may be rearranged and their number increased if desired and depending on the size and configuration of the centrifuge rotor. The structures shown represent preferred embodiments, however, for a small rotor.

In the embodiment of the invention which is shown in FIGURES 5 and 6 the double primed reference numerals refer to parts with the same numeral in FIGURES 1 and 2. This embodiment comprises a rotor 12" including a disc stack 28" surrounded by a compaction zone in which are positioned a plurality of circumferentially spaced vanes 100. The vanes 100 generally extend longitudinally of the rotor, and as shown in FIGURE 6 are disposed to present curved non-radial surfaces. The vanes are secured to an upper frusto-conical support 102 and a lower frusto-conical support 104 which are disposed between cone 38" and the element 50".

In operation, the wax solids moving outward press on the surfaces of elements 100 and slide outwardly thereon. As the solids move off the outer tip of the surfaces they fall out to the surface of a layer of carrier liquid and are discharged out of the rotor. The oil which is freed from the solids moves inwardly along the outermost surfaces of the compacting vanes, and then into the disc stack.

Figure 8:
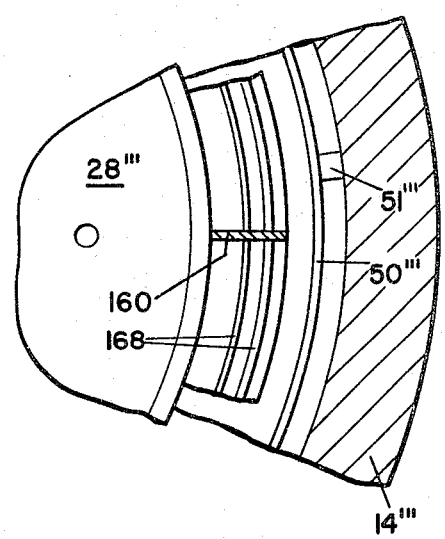

In the embodiment of the invention disclosed in FIGURES 7 and 8, the triple-primed reference numerals refer to parts with the same numeral in FIGURES 1 and 2.

In the compacting space outside the disc stack 28''' is disposed an assembly comprising support elements 160 which are circumferentially spaced about the axis, are secured at their upper and lower ends to frusto-conical elements 162 and 164, respectively. The elements 162 and 164 rest against the dividing cone 38''' and shell 14''', respectively. Mounted by the support elements are the nested and spaced upper frusto-conical elements 166 and lower frusto-conical elements 168.

In operation, the solids moving outwardly from the disc stack 28''' in this embodiment press on the non-radial surfaces presented by the frusto-conical elements 166, 168 and pass through the spaces between the elements. The oil liberated in the settling moves along the outside surfaces of the elements toward and into the disc stack. Alternatively the frusto-conical elements may have orifices as in the FIGURES 9, 10 embodiment to enhance the working of the solids.

Figure 9:
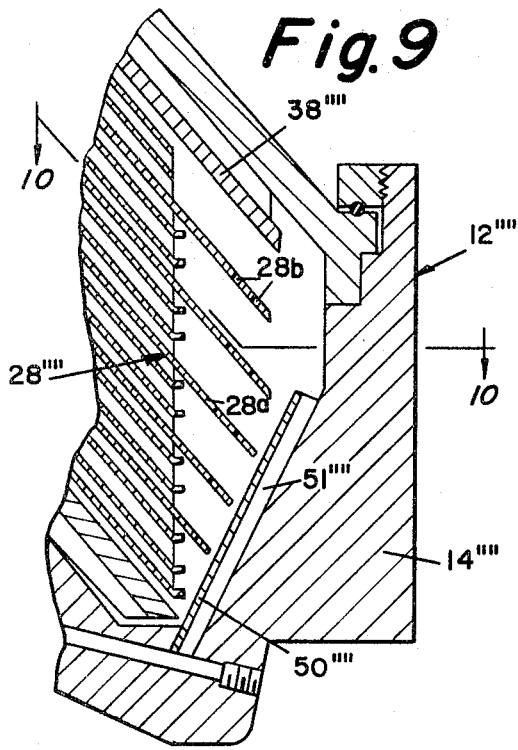
Figure 10:
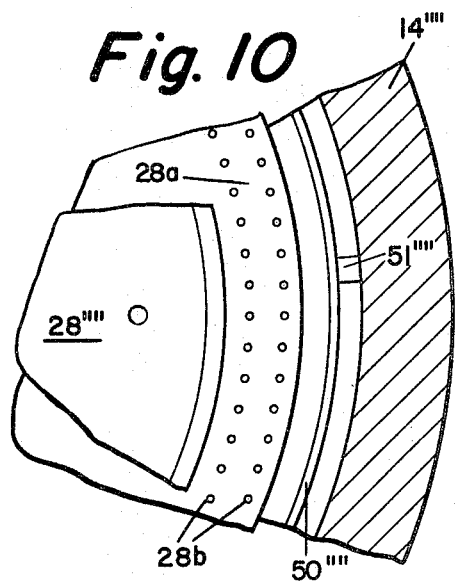

In the embodiment of FIGURES 9 and 10 quadruple-primed form of reference numerals are used. The rotor 12'''' contains the disc stack 28'''' with occasional discs 28a extending out beyond the stack into the compacting zone. The extending portions present non-radial surfaces against which outwardly moving solids may press. The extensions, as shown in FIGURE 10, are formed with spaced orifices 28b through which the solids may pass for additional working and compaction.

As pointed out above, this invention broadly contemplates the working of outwardly moving solids in a compacting space within a centrifuging zone. This working may be accomplished by the apparatuses described above as well as reasonable variations thereof. Our experimental work bears this out as indicated in the examples. The detailed action of the solids in the compacting zones of the various embodiments is not known. However, it is believed that at least three actions of different character transpire within the compacting spaces disclosed.

The first action is the pressing of the solids against a non-radial surface as they meet the surface in their outward movement toward the periphery of the rotor. Such pressing may include a mere contact upon which delicately associated solids may compact. The non-radial surfaces may be disposed at any angle to a radius, but it is assumed that for this type of action, the most thorough pressing will be done against a surface perpendicular to a radius. Pressing of the solids against a non-radial surface is common to all of the embodiments disclosed herein. Liquid liberated from the pressing moves inward toward the axis.

A second action of the solids is effected by their passage through an orifice. At it passes through an orifice each agglomerate of solids is worked against its neighbor. This working is accomplished by changes in relative motion of the stream filaments in the flow pattern and the velocity pattern particularly as the solids approach the orifice or other structure modifying the flow pattern. In such working, the solids or agglomerates are rearranged so that they approach each other more closely. This rearrangement may or may not be accompanied by a physical breaking of projections on individual solids or of junctures between solids in agglomerates so that the solids fit together closer. The exact action about the orifice depends, of course, on the velocity and the type of fluid passing through. As a higher degree of compaction is established liquid which filled the interstices between the solid particles and/or solid agglomerates is proportionately displaced and liberated from the agglomerates or solids bed. On the outside of the orifice the solids retain their rearrangement and move outwardly. The liberated liquid moves inward, may coalesce on the outer surfaces of the baffles and moves with substantially no interference from the outwardly moving solids. This action is present at least in the embodiments of FIGURES 1, 1a, 2, 2a, 3, 4, 9 and 10.

A third action on the solids is quite comparable to the second and is believed to be effected by the passage of solids between surfaces converging outward from the axis. This action is a working of the solids against their neighbors as they move toward the point of convergence. It must be assumed that the solids must work relatively to each other in such movement, and in so doing they rearrange themselves more compactly. This rearrangement may or may not be accompanied by a breakoff of projections of the individual solids, or indeed, of junctures between adjacent solids. Liquid liberated moves inward. The movement of the solids along converging surfaces will be present at least in the embodiments of FIGURES 1, 1a, 2, 2a, 3 and 4.

It must be reiterated that the exact action of the solids in the various compaction zones is not known. The above theorizing is intended not in any way to limit the scope of the invention but merely to assist those skilled in the art to better understand the invention.

In FIGURES 11 and 12 the reference numerals of FIGURES 1 and 2 augmented by 100 are again used to designate corresponding parts. The embodiment shown herein is designed for use with mixtures in which the compatible solids are lighter than a primary liquid in the mixture.

As shown, the disc elements 128 are truncated inwardly to provide a compaction space inside the stack. In the compaction space is the outer zig-zag baffle 153 and the inner baffle 155. These annular baffles are clamped in place between the dividing cone 138 and skirt 126. The openings similar to the openings in the baffles of FIGURES 1 and 2 are not aligned. A carrier liquid feed collar 157 is mounted spaced about center tube 124 if desired or necessary.

In operation, the mixture is fed through center tube 124 as with previous embodiments. The light solids move inwardly through the disc stack and through the baffles. The heavy liquid moves outward and may be discharged with assist from a heavy carrier liquid if desired or necessary, operating in earlier disclosed embodiments, over dam 134. Alternatively the heavy liquid may be discharged through peripheral nozzles, if the nature of the liquid permits. To assist discharge of light solids, a liquid carrier may be split down collar 157 to ride the solids out extension 140.

The action of the baffles 153, 155 in the compacting space on the light solids has result comparable to that of the action of the baffles in the earlier disclosed embodiments; namely the compaction and concentration of the solids. Variations of the structure of the baffles of the FIGURE 11 embodiment are within the scope of the invention. The baffle structures of the preceding embodiments suggest some variations.

Some lighter solids which may be compacted by the embodiments similar to that of FIGURES 11 and 12 are various flocculent solids lighter than the liquid in which they are mixed. It is, for instance, possible to dewax petroleum stocks with such apparatus if the oil-solvent liquid is heavier than the wax solids, as would be the case for instance if the solvent were one of the chlorinated hydrocarbons.

The theory set forth above in connection with the FIGURES 1–10 embodiments applies equally to the FIGURES 11–12 embodiment, except that the liberation and action occur as the solids move inwardly.

The following examples, meant not by way of limitation but as an illustration, are representative of operation of the apparatus disclosed in FIGURES 1 and 2.

*Example 1*

A rotor roughly 10 inches in diameter as disclosed in FIGURE 1 having about fifty spaced discs and baffles as shown was rotated at a speed of about 4500 r.p.m. A petroleum fraction having a pour point of approximately 40° F., diluted with methylethyl ketone, was fed at the rate of 1 gallon per minute at 5° F. Its wax content with solvent was 6%. A supply of about ½ gallon per minute of brine through the line 45 carried wax solids with the brine over the ring dam 34. Wax at 41% oil after decanting the brine and stripping off the solvent was produced.

*Example 2*

The apparatus of Example 1 was operated at the same speed and under the same conditions, including feed rate. However, in this operation the baffles 52 and 54 were removed. The wax discharged in the brine over the ring dam 34 analyzed at 48% oil after decanting the brine and stripping off the solvent.

In all embodiments the liberation of oil from the interstices between the wax solids as well as the entrainment of the solids themselves by the carrier layer flow may be facilitated by the addition of surface active agents, preferably of the ionic type, such as the commercial products known in the trade as Tergitol or the various organic phosphorus compounds such as sodium dodecyl phosphate as discussed in the U.S. Patent 2,793,169, which issued May 21, 1957. Such agents increase the tendency of the carrier liquid to wet the wax solids, and replace the oil on the surfaces thereof.

It should be understood that some solids with which the invention is useful for compacting may be discharged from the rotor without the aid of a carrier layer. In such case a simple nozzle or dividing cone arrangement may be utilized.

Mention is made again that this invention has a wide range of uses and is not limited to the dewaxing of hydrocarbon oil and other applications mentioned.

Additionally the process of the invention may be practiced in a number of different apparatuses aside from those disclosed herein. In this connection, reasonable variations of the apparatuses disclosed may be made. For instance in applications in which large clarification spaces are not felt to be required, the diameter of these spaces may be reduced and a larger portion of the rotor may be devoted to the working of the solids. Discs ⅓ the diameter of the rotor, for instance, are feasible.

Another variation may substitute as the compaction means, e.g. the baffles 52 and 54 of FIGURES 1 and 2, loose solid elements held in place in the rotor by centrifugal force. The elements may take the form of distillation tower packing such as small cylinders of suitable size of ceramic material, plastic, metal, especially stainless steel; berl saddles; Raschig rings; or other commercially available packings of similar varieties. In operation such loose solid elements will present non-radial surfaces against which the solids in the mixture may compact and irregularly restricted flow paths which serve to work the solids as do the orifices in the perforated baffles discussed above.

It is thus to be understood that the above particular description is by way of illustration and not of limitation, and that changes, omissions, additions, substitutions and/or other modifications may be made without departing from the spirit of the invention. Accordingly it is intended that the patent shall cover, by suitable expression in the claims, the various features of patentable novelty that reside in the invention.

We claim:

1. The process of compacting solids in a mixture of such solids and a liquid and of separating the liquid in clarified condition from the solids, which process includes the steps of introducing the mixture into a zone of centrifuging comprising thin stacked frusto-conical clarifying spaces and a compacting space radially removed from and communicating with the clarifying spaces, causing the solids to pass from said clarifying spaces and to settle on a non-radial compaction surface portion in the compacting space, the surface portion being spaced radially from said clarifying spaces and being between the inner and outer periphery of the zone, causing the solids with entrained liquid to pass through a restricted opening in the non-radial surface portion and from said surface portion and into a carrier liquid, discharging the carrier liquid with the solids from the zone, separately discharging the clarified liquid, and moving the liquid separated from the solids after passing through the restricted opening back along the opposite face of the compaction surface portion, and then into the clarifying spaces to discharge with the clarified liquid.

2. The process of dewaxing hydrocarbon oil including the steps of chilling the oil to solidify a portion of the wax, introducing the mixture into a zone of centrifuging comprising thin stacked frusto-conical spaces and a compacting space radially removed from and communicating with the clarifying spaces, causing the wax solids to pass from the clarifying spaces and to settle on a non-radial compaction surface portion in the compacting space, the surface portion being spaced from the clarifying spaces toward a periphery of the zone and spaced from the periphery, causing the wax solids with entrained oil to pass through a restricted opening in said surface portion and into a carrier liquid, discharging the carrier liquid with the wax solids from the zone separately discharging the clarified oil from the zone, and moving the liquid separated from the solids after passing through the restricted opening back along the opposite face of the compaction surface portion and then into the clarifying spaces to discharge with the clarified liquid.

3. The process as described in claim 2 wherein the restricted opening is about 1/8 inch.

References Cited

UNITED STATES PATENTS

| | | | |
|---|---|---|---|
| 2,249,653 | 7/1941 | Hartstick | 233—29 |
| 2,261,724 | 11/1941 | Holm | 208—31 |
| 2,266,553 | 12/1941 | Jones | 208—33 |
| 2,289,431 | 7/1942 | Jung | 208—33 |
| 2,578,485 | 12/1951 | Nyrop | 233—46 |
| 2,628,021 | 2/1953 | Staaff | 233—46 |
| 2,952,609 | 9/1960 | Dobson et al. | 208—33 |
| 3,036,759 | 5/1962 | Bergner | 233—29 |

FOREIGN PATENTS

| | | |
|---|---|---|
| 530,419 | 7/1931 | Germany. |
| 408,926 | 7/1932 | Great Britain. |
| 426,920 | 4/1935 | Great Britain. |

DELBERT E. GANTZ, *Primary Examiner.*

ALPHONSO D. SULLIVAN, JOSEPH R. LIBERMAN,
*Examiners.*

H. LEVINE, *Assistant Examiner.*